United States Patent
Grafl et al.

(10) Patent No.: US 8,053,141 B2
(45) Date of Patent: Nov. 8, 2011

(54) CONTACT PLATE FOR FUEL CELLS

(75) Inventors: Dieter Grafl, Ulm (DE); Raimund Stroebel, Ulm (DE); Lothar Quick, Nersingen (DE); Joachim Scherer, Ulm (DE); Christian Schleier, Günzburg (DE); Bernd Gaugler, Ulm (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 1394 days.

(21) Appl. No.: 10/590,681

(22) PCT Filed: Feb. 25, 2005

(86) PCT No.: PCT/EP2005/002158
§ 371 (c)(1),
(2), (4) Date: Aug. 25, 2006

(87) PCT Pub. No.: WO2005/081614
PCT Pub. Date: Sep. 9, 2005

(65) Prior Publication Data
US 2008/0044711 A1    Feb. 21, 2008

(30) Foreign Application Priority Data
Feb. 26, 2004  (DE) .................... 10 2004 009 869

(51) Int. Cl.
*H01M 4/64* (2006.01)
(52) U.S. Cl. ......... 429/521; 429/517; 429/518; 429/519
(58) Field of Classification Search ............. 429/34–36, 429/507–514, 517–522
See application file for complete search history.

(56) References Cited

U.S. PATENT DOCUMENTS

| | | | |
|---|---|---|---|
| 5,776,624 A | 7/1998 | Neutzler | |
| 6,372,376 B1* | 4/2002 | Fronk et al. | 429/487 |
| 6,383,678 B1* | 5/2002 | Kaneko et al. | 429/34 |
| 2003/0194597 A1* | 10/2003 | Ganski et al. | 429/38 |
| 2004/0185322 A1* | 9/2004 | Tanaka et al. | 429/35 |
| 2005/0064267 A1 | 3/2005 | Guttermann et al. | |
| 2007/0178349 A1* | 8/2007 | Iino et al. | 429/34 |

FOREIGN PATENT DOCUMENTS

| | | |
|---|---|---|
| CA | 2 240 270 C | 7/2007 |
| DE | 195 32 791 A1 | 12/1996 |
| DE | 195 47 699 C2 | 7/1997 |
| DE | 102 35 598 A1 | 2/2004 |

(Continued)

*Primary Examiner* — Patrick Ryan
*Assistant Examiner* — Muhammad Siddiquee
(74) *Attorney, Agent, or Firm* — Marshall & Melhorn LLC

(57) ABSTRACT

The present invention relates to a contact plate for fuel cells with a coherent active area (11) on at least one side of the contact plate, wherein the active area (11) consists of a contact surface (2) which over the whole surface comprises a coating (4) of an electrically conductive, corrosion-resistant material, and of recesses (3) so that the recesses (3) form a channel structure, wherein the coating (4) furthermore at least in the bottom regions (5) of the recesses (3) is omitted. The invention further relates to a corresponding fuel cell or to a fuel cell stack with at least one such contact plate as well as to various methods for manufacturing such contact plates which may serve as bipolar plates as well as monopolar plates or end plates. With the contact plate according to the invention, one achieves an optimally reduced contact resistance with a minimal material expense for the coating (4).

13 Claims, 2 Drawing Sheets

FOREIGN PATENT DOCUMENTS

| | | |
|---|---|---|
| EP | 0 851 518 A1 | 7/1998 |
| EP | 1 009 051 A2 | 6/2000 |
| EP | 1 107 340 A2 | 6/2001 |
| JP | 59154774 A | 9/1984 |
| WO | WO 03/044886 A2 | 5/2003 |

* cited by examiner

CONTACT PLATE FOR FUEL CELLS

FIELD OF THE INVENTION

The invention relates to a contact plate for fuel cells with an active area which comprises a coating, according to the preamble of the main claim. The invention further relates to a fuel cell and to a fuel cell stack with at least one such contact plate, as well as to methods for manufacturing such contact plates.

BACKGROUND OF THE INVENTION

With a contact plate of the known type, it may be the case of a bipolar plate or an end plate for a fuel cell stack, or also of a monopolar plate for an individual fuel cell or fuel cells arranged in a plane. Such contact plates have several functions. On the one hand they serve for ensuring an electrical conductive connection to an adjacent layer with which it is the case of a gas diffusion layer, an electrode, an electrolyte membrane or a further fuel cell, on the other hand for supplying or the leading-away of reactands and/or reaction products, for which a channel structure is provided, and further also for leading-away reaction heat. In particular for mobile applications, a manufacture of contact plates from metal may be desirable since the larger mechanical stability of metal compared to other materials permits a compacter construction of fuel cells and fuel cell stacks.

At the same time a further problem exists due to the fact those metals which are adequately corrosion-resistant in order to withstand the aggressive conditions usually prevailing in the fuel cells and which may considered with regard to their economical aspects, tend to undergo passivation. Thus for example stainless steel forms a passive layer of chromium oxide, by which means does a corrosion resistance result at all. A passive layer however leads to a considerably increased electrical contact resistance, by which means the function of a contact plate of creating an electrical connection which is low in losses, is compromised to beyond an acceptable level.

It is known to circumvent this problem by way of a coating of contact plates. Thus for example the document EP 1 107 340 A2 discloses a contact plate of the known type for fuel cells, with an active area which is envisaged for contact on a diffusion layer and which comprises recesses next to a contact surface so that the recesses form a channel structure, wherein the active area has a coating of a conductive, corrosion-resistant material. With this, according to the state of the art not only is the contact surface provided for contact on an adjacent layer, but also the whole active area including recesses is coated. Such an embodiment is suggested by way of deposition techniques for the coating which have been used until now, but however entails the significant disadvantage that extremely large quantities of coating material are required. Since very costly materials are commonly used as a coating material, for example gold or platinum, excessively high manufacturing costs therefore arise. Furthermore the complete-surfaced, non-selective coating of the active area involves the danger that the flow properties of the contact plates are changed to a significant extent due to the accumulation of the coating material in the bottom region of the recesses/channel structures.

SUMMARY OF THE INVENTION

It is therefore the object of the invention to develop a contact plate of the known type, which avoids the mentioned disadvantages, with which although a manufacture from a passivating material, a lower electrical contact resistance at a contact surface is ensured but at the same time an increased material expense for a suitable coating is avoided whilst saving in particular, expensive materials. It is also the object of the invention, by way of the use of corresponding contact plates to provide compact fuel cells and a fuel cell stack and to provide methods with which such contact plates may be manufactured with an as low as possible expense.

According to the invention this object is achieved by a contact plate with the characterising features of the main claim in combination with the features of the preamble of the main claim, as well as by a fuel cell or a fuel cell stack with the features of claim 7 as well as by way of a method with the features of claim 8 or claim 9. Advantageous designs of the invention are to be deduced with the features of the dependent claims.

By way of the design of the contact plate with a coherent (continuous) active area on at least one side of the contact plate, wherein the active area consists of a contact surface which has a coating of a conductive, corrosion-resistant material over the whole surface, and of a material comprising a channel structure, in such a manner that the coating at least in bottom regions of the recesses is omitted, one achieves the desired saving of coating material. It is clear that such a design is of particular relevance to those plates which based on a plate body, manufactured from passivating material, thus of a material which on the one hand demands measures for reducing a contact resistance on contact surfaces, but on the other hand due to a sufficient passivity does not require a complete coating as a corrosion protection. In relation to this, the use of plate bodies of stainless steel or titanium are particularly advantageous with regard to a sufficient stability even with a compact construction, as well as for a life duration which is as long as possible and which is free of any impairment.

By way of keeping the recesses, which in the typical case of a plane plate thus recede behind a plane defined by the contact surface, free from coating at least in the bottom regions of the recesses, the contact resistance at the contact surface is not increased since the recesses in any case do not contact a layer adjacent to the contact plate. A coating there would even be of a hindrance since the recesses form the channel structure and there, for optimising for example a flow of a reactand or reaction product, surface properties may be desired which under certain circumstances are not compatible with the coating, wherein the coating there would furthermore unnecessarily reduce the flow cross section there.

A coating of the contact surface within the context of the present document may also still continue to be described as complete-surfaced (over the whole surface) if it has pores with a size of up to 150 μm. At the same time it is to be taken into account that the coating must primarily serve to reduce the contact resistance and not as a corrosion protection.

The described active area designed according to the invention at the same time does not necessarily need to be the only active area of the contact plate. For achieving an advantageous effect it is sufficient if one of several active areas or regions is configured in the described manner. However those contact plates with which all active regions have corresponding features, in particular e.g. bipolar plates with a corresponding design of two sides are however to be preferred.

From that which has been said up to now, it results that the contact plate according to the invention is designed in a particularly advantageous manner when the coating extends exclusively over the contact surface or the contact surfaces, if thus the recesses are completely left free.

A further advantage results if the coating additionally leaves free an edge region of the corresponding side of the contact plate outside the active area, which there is then not coated. This edge region usually needs to be sealed, in particular against any exit of reaction products and/or reactands between the contact plate and a adjacent layer. Such a sealing is simplified if the edge region is not coated. In contrast, a coating which is continued into the edge region due to the surface properties resulting would therefore be of a hindrance with regard to the attachment/fixation of a seal.

Various coating materials are considered for the coating. Criteria for a suitable selection are the electrical conductivity and the corrosion resistance as well as a good adhesive property for the secure connection to a plate body and not lastly an availability which is as inexpensive as possible. With regard to these criteria, in particular coating materials which contain one or more of the following materials or consist of one or more of these materials or their alloys are advantageous: carbon, preferably in the form of graphite, niobium, rare earth metals, precious metals, preferably gold, platinum, silver, palladium and/or rhodium, metal boride, metal nitride and/or metal carbide, preferably titanium boride, titanium nitride, titanium carbide and/or chromium nitride, silicon carbide. A dispersion or suspension with particles of such or similar materials may be applied as a coating material for increasing the conductivity with a simultaneous favourable adhesive property, depending on the manner of deposition. These dispersions may advantageously contain binding agent based on a thermoplastic or duroplastic polymer (e.g. polyurethane, polyacrylic, polyester, phenol resins etc.) which on drying the layer is melted on or cross-linked and thus connects the particles amongst one another or the coating to the plate body.

In order to achieve a satisfactory reduction of the contact resistance however with a material expense which is as low as possible, the coating in the case of a coating with graphite is preferably to be carried out with a layer thickness of between 5 µm and 200 µm, particularly preferably between 10 µm and 100 µm. In other cases, in particular with a coating with metal (for example gold), for the same reasons a layer thickness of between 0.02 µm and 5 µm lends itself, preferably between 0.05 µm and 0.5 µm. Furthermore, for achieving an improvement of the conductive connection which is as effective as possible and with an expense which is not too great, the layer is to be deposited with a surface density of between 0.32 g/m$^2$ and 80 g/m$^2$, particularly preferably between 0.8 g/m$^2$ and 8 g/m$^2$. Contact plates of the described type may be designed in a very compact and thus space-saving and weight-saving manner by way of the use of a metallic plate body. In this context corresponding contact plates with a material thickness between 0.05 mm and 0.5 mm are advantageous and are still sufficiently stable, wherein particularly good results are achieved with contact plates of a material thickness between 0.07 mm and 0.2 mm.

In order to permit an economically acceptable production of contact plates according to the invention, those methods which permit an omission of regions on depositing a coating, thus only a partial coating, without additional expense are advantageous. For this e.g. a deposition of the coating by way of screen printing, roller printing or stencil printing method particularly lends itself, in particular with the use of dispersions or suspensions as a coating material. By way of the fact that recessed regions on deposition of the corresponding coating material by way of screen printing or roller printing are in any case not usually reached by the coating material, a prior masking of the recesses or the bottom regions of the recesses before the coating becomes superfluous. An additional manufacturing expense caused by the design of the contact plate according to the invention is thus avoided on account of this. Even if the coating leaves free an edge region of the corresponding side of the contact plate, although a masking of the edge region is possible for this, it is not however necessary.

With the use of an electrolytically precipitatable coating material, a deposition of the coating by way of pad galvanisation (tampon plating) particularly lends itself. For this, the electrically conducting plate body as an electrode is connected to a pole of the voltage source whilst a second electrode which is impregnated with an electrolyte and/or through which electrolyte is flowing, or which is surrounded by a material which for its part is impregnated with an electrolyte and/or through which this electrolyte is flowing, is subsequently led over those locations which are to be coated. In contrast to a conventional galvanic coating in an immersion bath, a selective and partial coating is possible in a very simple manner by way of this. Also pad galvanisation (tampon plating) in a very simple manner permits the realisation of a design of a contact plate according to the invention without an expensive coating becoming necessary. By way of a suitable poling of the two electrodes, the coating material is precipitated onto the plate body where the second electrode or the material surrounding this contacts the plate body with the electrolyte. Even with an automisation of the method in a simple manner one may ensure that at the same time only the contact surface is reached. With typically embodiments of the method, at the same time the second electrode is given for example by way of a wire-like or plate-like metallic conductor, around which a non-woven is wrapped which is capable of accommodating the required electrolyte.

An improved bonding of the coating on the contact surface may finally be achieved in that the coating during and/or after the deposition is melted or cured by way of heating the contact plate.

Contact plates of the type described here are particularly suitable for use in fuel cells or fuel cell stacks or also in other electrochemical cells, wherein in such cells or connections of cells, according to that which has been said, they may form monopolar or bipolar plates or components of such plates.

BRIEF DESCRIPTION OF THE DRAWINGS

One embodiment example of the invention is explained hereinafter by way of the FIGS. 1a and 1b. There are shown in FIG. 1a a cross section through part of a contact plate according to the invention and FIG. 1b a plan view of a bipolar plate composed of two such contact plates.

DETAILED DESCRIPTION OF THE INVENTION

Figure 1A:
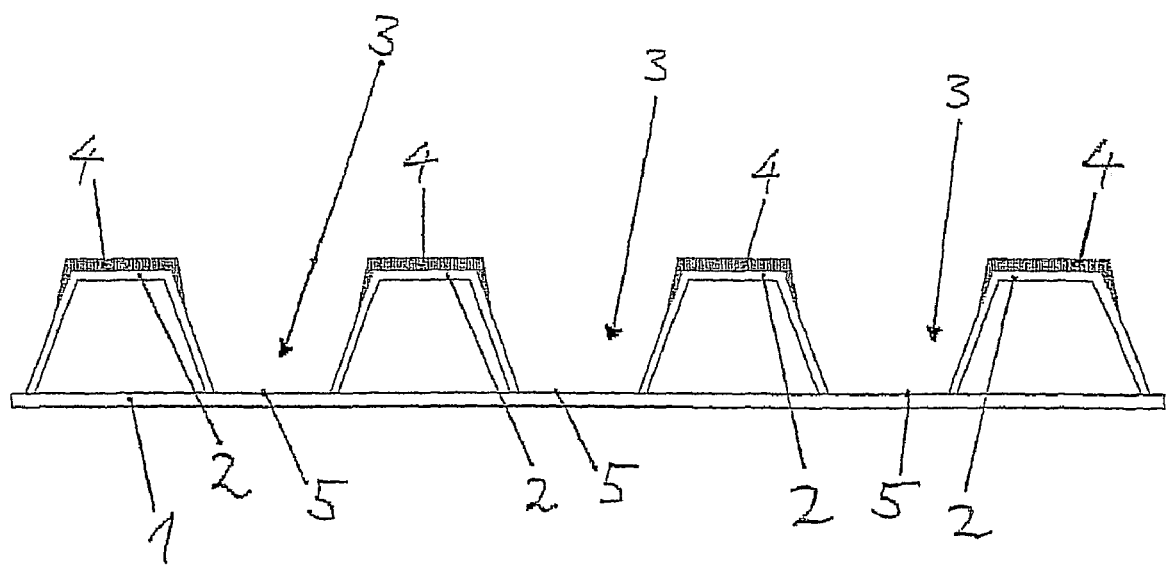

With the contact plate shown in FIG. 1a, it is the case one half of a bipolar plate for a fuel cell stack. In FIG. 1a one may recognise a plate body 1 which is manufactured of stainless steel. Corresponding embodiments of a different passivating and/or corrosion-stable metal are likewise possible. Directed towards the top in FIG. 1a, the contact plate has an active area which consists of a contact surface 2 as well as of recesses 3 which form a channel structure, wherein the contact surface 2 is interrupted by these recesses 3. The channel structure at the same times serves for the supply and removal of reactands or reaction products for a polymer electrolyte membrane contacting the contact surface 2, which is not shown here, or a diffusion layer or electrode lying between the contact plate and the polymer electrolyte membrane.

The contact surface 2 carries a coating 4 of platinum which covers the contact surface 2 over the whole area, but completely leaves free the recesses 3 with the exception of edge or transition regions which directly border the contact surface. In particular bottom regions 5 of the channel structure formed by the recesses 3 are free of the coating 4. The stainless steel from which the plate carrier 1 is manufactured, forms a passive layer there which in particular contains chromium oxide and which also protects the plate carrier 1 from corrosion where the active area which is only particularly coated has no coating. By way of the coating 4 of platinum, wherein also a different electrically conductive, corrosion-resistant material may be considered for the coating 4, a good electrical contact with a low contact resistance to an adjacent layer which is formed by a polymer electrolyte membrane or the corresponding diffusion layer or electrode is ensured. Such a contact would be prevented by the passive layer if the coating 4 were to be absent.

Figure 1B:
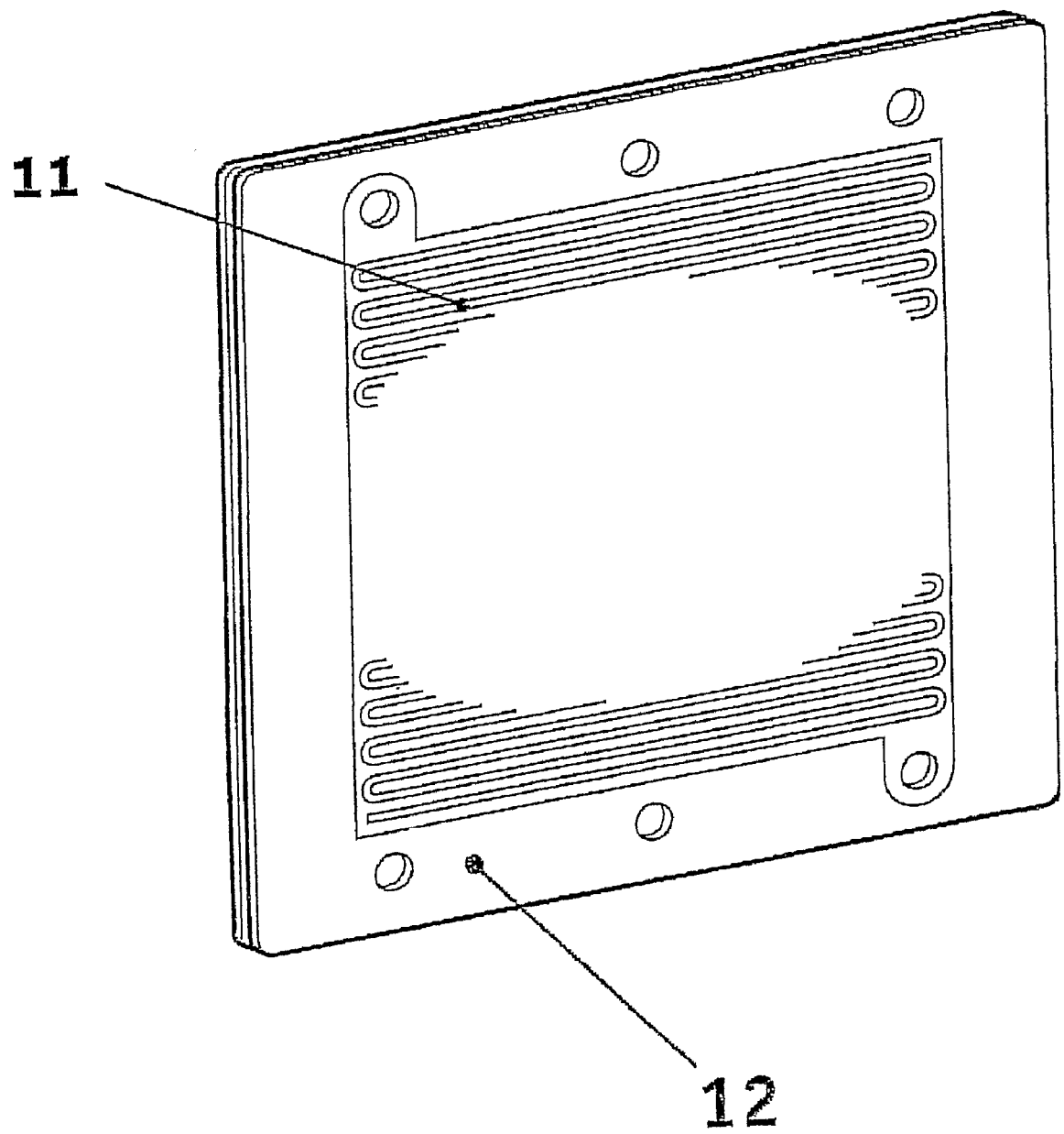

An edge region 12 of the contact plate which is shown in FIG. 1b and is outside the active area is likewise not coated, thus is left free of the coating 4. This simplifies a good sealing of the contact plate to the adjacent layer in this edge region 12.

By way of the embossing of a channel structure, the bipolar plate of the described embodiment example has an entire thickness of about 1 mm which corresponds to a channel depth of about 0.4 mm. The bipolar plate at the same time is formed by two parts of the type shown in FIG. 1a which are arranged on one another and are directed in opposite directions. Embodiments with which an additional layer is arranged between the two parts for achieving a greater stability or an increased thermal conductivity are conceivable. According to the part of the bipolar plate shown in FIG. 1a, also an end plate of a fuel cell stack or a monopolar plate may be designed for an individual fuel cell or several fuel cells arranged next to one another. The coating 4 with the shown embodiment example has a layer thickness of about 5 μm and is deposited with a surface density of about 10.6 g/m².

The coating 4 was deposited by pad galvanisation (tampon plating). In the same manner a manufacture of a coating of other galvanically pecipitatable substances would be possible, wherein in particular a coating with another precious metal such as gold would lend itself. With pad galvanisation (tampon plating), the plate carrier 1 itself serves as an electrode, whilst a second electrode which is surrounded by a material which is impregnated with a suitable electrolyte is led over the contact surface 2. By way of galvanic precipitation, the coating 4 then grows where the second electrode or the material surrounding it contacts the plate carrier 1 with the electrolyte, specifically at the contact surface 2, thus where the plate carrier 1 is raised. At the same time a wrapping of the second electrode of a non-woven may be provided as a material accommodating the electrolyte and surrounding the second electrode. A leaving-free of the recesses 3 during pad galvinisation (tampon plating) results also without any complicated prior masking of locations which are to remain free. Thus a partial coating of the contact plate also becomes possible in a quasi-continuous process with short cycle times. Also other lateral limitable coating methods also known as metering methods, may alternatively be used, such as spin-spraying or a use of slotted nozzles.

In particular one suitable embodiment of a contact plate according to the invention is possible with a coating 4 deposited by screen printing or roller printing, with which the coating 4 for example may be formed by way of a graphite-containing suspension or other suspensions or dispersions. By way of printing on a dispersion or suspension, in particular by way of screen printing or roller printing, onto the active area of the contact plate, likewise in a simple manner, a selective coating exclusively of the contact surface 2 may be achieved without a prior masking of the recesses 3 becoming necessary. An improved adhesion of the coating 4 on the contact surface 2 may be achieved on the basis of a thermoplastic or duroplastic polymer which melts or cross links on drying. A coating 4 which as with the embodiment example described by way of the figures is metallic may be realised as a material-saving conductor layer by way of printing a diluted metal dispersion onto the active area of the contact plate and subsequent melting, curing and cross linking onto the contact surface 2 of stainless steel.

The invention claimed is:

1. A contact plate for fuel cells comprising:
   a coherent active area on at least one side of the contact plate, wherein said side is for contacting at least one of a diffusion layer, a fuel cell electrode and an electrolyte membrane; and
   a coating of an electrically conductive, corrosion resistant material;
   wherein said contact plate is constructed from passivating, corrosion-resistant metal;
   wherein said active area includes a contact surface and recesses, such that said recesses form a channel structure;
   wherein said coating includes carbon for depositing in liquid form, and said coating is disposed only on said contact surface of said active area.

2. The contact plate of claim 1, wherein said contact plate is constructed from one of a stainless steel and a titanium.

3. The contact plate of claim 1, wherein said coating extends over the entire said contact surface.

4. The contact plate of claim 1, wherein said contact plate further includes an edge region, said edge region being outside of said active area.

5. The contact plate of claim 1, wherein said carbon is in the form of graphite.

6. The contact plate of claim 1, wherein said coating further includes at least one of a niobium, a rare earth metal, a precious metal, a metal boride, a metal nitride, a metal carbide, a titanium nitride, a titanium carbide, a chromium nitride, and a silicon carbide.

7. The contact plate of claim 1, wherein said contact plate has a material thickness between about 0.05 mm and about 0.5 mm.

8. The contact plate of claim 1, wherein said contact plate has a material thickness between about 0.07 mm and about 0.2 mm.

9. The contact plate of claim 1, wherein said contact plate is one of a monopolar and a bipolar plate.

10. The contact plate of claim 1, wherein said contact plate is an end plate.

11. The contact plate of claim 1, wherein said coating includes one of a thermoplastic and a thermoset binding agent.

12. The contact plate of claim 1, wherein in areas without said coating, said metallic contact plate has a passive surface.

13. The contact plate of claim 12, wherein said areas without said coating are said recesses.

* * * * *